May 19, 1942.  J. TYLER ET AL  2,283,473
SLIDE RULE
Filed Jan. 23, 1940
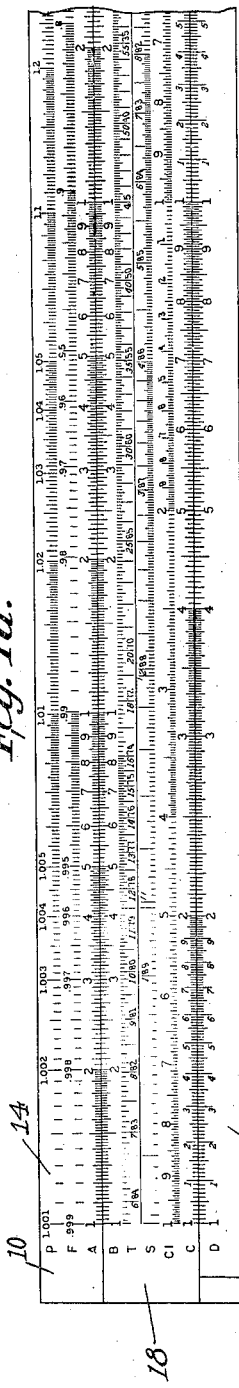
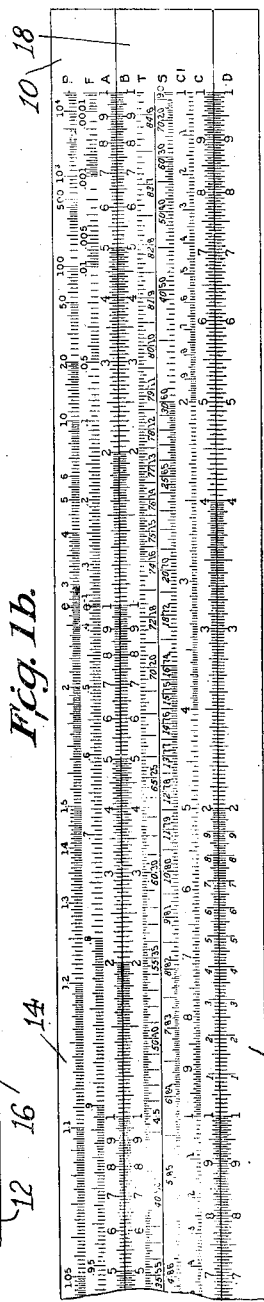
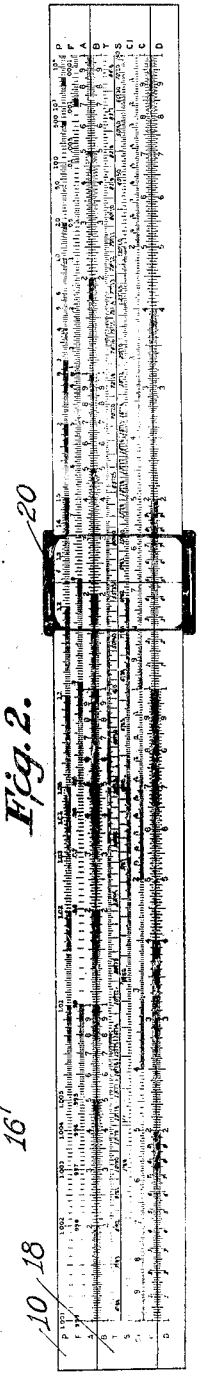
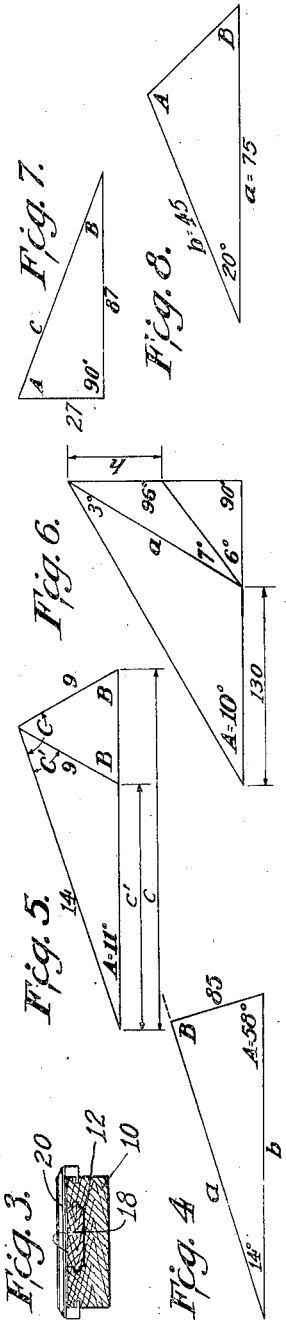
Inventors
John Tyler
Lyman M. Kells
Willis F. Kern
James R. Bland
By Cushman Darby & Cushman
Attorney Patented May 19, 1942

2,283,473

UNITED STATES PATENT OFFICE 2,283,473

SLIDE RULE

John Tyler, Lyman M. Kells, Willis F. Kern, and James R. Bland, Annapolis, Md.

Application January 23, 1940, Serial No. 315,208

5 Claims. (Cl. 235—70)

The present invention relates to slide rules wherein a plurality of members are arranged for movement with respect to one another, said members having scales thereon graduated to co-operate in the solution of problems.

The scales employed in the present invention are shown arranged on a structure including a channeled body member, with a slide member mounted for movement in a longitudinal direction in the channel. While the arrangement of the scales on such a structure is preferred, from a practical operating standpoint, it will be understood that certain principles of the invention may be adapted for use on other slide rule structures.

The slide rule of this invention is an improvement over prior art rules, particularly from the standpoint of practical operability. The well-known double face log log slide rule is mentioned herein, for the reason that it is now in general use, and comparison of the advantages of the present rule with it assists toward a clear understanding of the invention. A now well known slide rule of this type is described in Patent No. 2,170,144, Kells et al., August 22, 1939. Compared with the rule of this patent, the present rule is more simple in appearance and construction, is easier to operate, and eliminates errors in the solutions of problems by reducing the necessary mechanical manipulations of the rule as will be more fully pointed out hereinafter. The rule of the present invention departs basically from the well-known double face log log rules, providing a distinctly different manner of operation.

One of the principal objects of the invention is to provide a slide rule having a tangent scale covering an increased range of angles, associated with other logarithmic scales of novel arrangement, whereby a greater variety of problems involving the tangents of angles may be solved while eliminating mechanical manipulations required in using prior art rules.

Another object of the invention is to provide a slide rule having a sine scale of extended length, cooperating with logarithmic scales of novel arrangement, and with the aforementioned tangent scale, which permits more convenient solutions of problems involving the sines of angles while reducing the mechanical manipulations required in using the rule.

Another object of the invention is to provide a new arrangement of a scale graduated in accordance with the logarithms of logarithms of numbers greater than unity, associated with a novel arrangement of the well-known logarithmic scales, resulting in more convenient solutions of problems. For example, successive positive powers and fractional powers of given numbers greater than unity may be obtained using these scales with a single setting of the slide. These scales likewise eliminate mechanical manipulations of the rule formerly required in the use of previous slide rules, and they permit the operator to easily locate the position of the decimal point, for instance, in the above mentioned types of problems.

Another object of the invention is to provide a new arrangement of a scale of logarithms of cologarithms of numbers less than unity, associated with a novel arrangement of the ordinary logarithmic scales, which results in more convenient solutions of problems. For example, successive positive powers and fractional powers of given numbers less than unity may be obtained, using these scales, with a single setting of the slide. These scales also eliminate mechanical manipulations of the rule which were previously required in the art, and permit the operator to easily locate the position of the decimal point, for instance, in the above mentioned types of problems.

Another object of the invention is to provide a slide rule having scales graduated in accordance with the logarithms of logarithms of numbers greater than unity, and logarithms of co-logarithms of numbers less than unity, associated with a novel arrangement of the ordinary logarithmic scales, whereby more convenient solutions of problems are obtained. For example, with the cooperation of these scales, successive positive and negative powers and fractional powers of given numbers greater and less than unity may be obtained, with a single setting of the rule. As in the preceding objectives, these results are obtained with reduced mechanical manipulations of the rule, and the operator may easily locate the position of the decimal point.

Another object of the invention is to provide a slide rule with fewer scales than formerly required but having all of the advantages mentioned above. The present slide rule maintains the number of mechanical manipulations required in the solutions of problems, at a minimum, without using so-called folded scales, which have been found to be somewhat confusing in use, and themselves require more manipulations than do the scales of the present rule. The simplified arrangement of the scales on the present rule, reduces the number of inverted scales formerly found to be necessary or convenient.

Another object of the invention is to provide a slide rule having a novel arrangement of the scales graduated in accordance with the logarithms of numbers, whereby more convenient solutions of problems are obtained with reduced mechanical manipulations of the rule. For instance, these scales permit more convenient and simple solutions of such problems as successive multiplications and divisions of a multiplicity of numbers in an expression.

In the drawing which is illustrative of the most convenient arrangement of scales in practicing the invention:

Figures 1a and 1b are top plan views of a practical rule made in accordance with the invention, showing the rule in two parts broken at the center, a portion of the rule adjacent its center being repeated in each figure. It will be understood, however, that the physical rule is in one unit, and not broken as shown in these views.

Figure 2 is also a top plan view of the rule, reduced in size, showing it as a unitary structure, having associated therewith the well-known hair line indicator.

Figure 3 is a transverse vertical sectional view through the rule showing the arrangement of the body, slide and hair line indicator.

Figures 4 through 8 are triangles, not drawn to scale, illustrating problems which are discussed herein.

Most slide rules are graduated using logarithms, Napier having conceived of the latter in 1614. Logarithmic scales were probably first arranged to be moved with respect to one another by one Oughtred, and in 1675 Isaac Newton is said to have suggested the use of the indicating member. Various improvements in the fundamental concept were developed from time to time, including the square and cube scales by Warner in 1722, the inverted logarithmic scale by Everard in 1755, and the log log scale by Roget in 1800. More recently, many scales have been devised for special uses, including the solutions of triangles, surveying and business problems.

For many years a rule having a single face comprising a channeled body with a slide therein was most widely used, and is known, because of the arrangement of its scales on the structure, as the Mannheim type rule. Certain difficulties are involved in the use of the Mannheim type rule, which led to the later development of the double face rule having log log scales thereon. A recent refinement of that type of rule is disclosed in the said Kells et al. Patent No. 2,170,144. The present rule is an improvement over all of the above generally mentioned prior art rules and as stated above, comparison is made with the rule of the said Kells et al. patent to explain the departure from and improvement over the most recent practical development in slide rules.

While the rule of the said Kells et al. patent is referred to in bringing out the advantages of the present invention, the present rule may be said to be fundamentally an improvement of the well-known Mannheim type rule which carried all of the scales on one face thereof.

In considering slide rules generally, it must be understood that from a practical standpoint, arrangements of scales which unduly complicate the manner of operation of the rules, including increasing various kinds of mechanical manipulations, are not of great assistance to most slide rule users. Fundamentally, the slide rule is a time saver which should be a fool proof device employed while the operator has his mind on the problems being solved, and any intricacies of the rule or in its operation which divert attention from said problems constitute grave disadvantages. The present rule is intended to improve the Mannheim type rule, which had scales all on one face of the rule for performing multiplication, division, and the extraction of square and cube roots. In using the Mannheim type rule, however, it was frequently necessary to "change the index" even in the solution of relatively simple problems. The term to "change the index" is well-known in the art, meaning to reverse the slide of the rule end for end with the assistance of the hairline indicator, by moving the hairline to one end, or index of the slide, and then shifting the slide longitudinally until its other end or index comes under the hairline. Frequent shifting of the index in using the Mannheim type rule led to inaccuracy, loss of time, and confusion.

Furthermore, in the Mannheim type rule, problems involving the logarithms of trigonometric functions could not be solved without completely turning the slide over in the body, which was also a time wasting, inaccurate and confusing mechanical manipulation.

In the practical slide rules of the prior art, including the Mannheim type rule, the double face log log rule, and others, the tangent scale employed is only graduated to include angles up to 45°. In using these rules, certain general operating principles apply in some cases, but do not apply in others, so that the operator of the rule must constantly keep in mind the intricacies of the rule when his mind should remain with the problem being solved.

The commonly used Mannheim type rule is not provided with the log log or power scales, for evaluating such expressions as for instance $(8.32)^{5.16}$ or $(.134)^{3.11}$. As the sciences have progressed, and in applications of thermo-dynamics to changing states of substances involving heat, light, and many other phenomena, expressions similar to the above are constantly encountered and the Mannheim type rule is incapable of physically dealing with them.

The so-called double face log log rule was designed to overcome the above-mentioned deficiencies of the Mannheim type rule. However, in overcoming them, the double face log log rule presented such a problem in mechanical manipulation, and so diverted the operator's attention from the problems being solved, that it has not been entirely satisfactory.

The present rule then is basically an improvement of the old Mannheim type rule, and reference is made here to the double face log log rule, particularly the most recent refinement thereof disclosed in the said Kells et al. Patent No. 2,170,144, to demonstrate how the present rule more effectively provides for the solutions of problems which now frequently arise in the present development of the sciences, while decreasing the necessary mechanical manipulations and thereby preventing the resulting diversion of the mind of the operator from the problems being solved. The rule of the present invention likewise eliminates confusion in the mind of the operator by decreasing the number of scales which need be referred to in the solutions of problems.

Referring to Figures 1a, 1b and 2, a now practical slide rule constructed to a 16 inch base length is described. It will be understood, however, that the base length of the scales may be increased or decreased within limits as found to be convenient, without departing from the invention. Moreover, the scales may be rearranged on the body member and slide, as found to be convenient.

The slide rule comprises a body member 10 having a central longitudinal channel 12 therein, which channel divides the face of the rule into an upper longitudinal area 14 and a lower longitudinal area 16. Disposed in said channel is an elongated slide member 18, of approximately the same length as the body 10. The slide and body are provided with any suitable means such as the tongue and groove construction shown in Figure 2, to permit the slide to move longitudinally in the body between the areas 14 and 16 thereof, without the probability of being accidentally displaced or moved from proper adjustment therein. A well-known indicator 20, comprising a transparent plate with a hairline thereon, is mounted on the face of the rule for movement along the same.

On the bottom area 16 of the body member, along the edge of the channel, there is a scale D, graduated in accordance with the logarithms of numbers from 1 to 10, and once repeated within the base length of the rule, that is, within the arbitrary base length of 16 inches, thus giving a unit length of 8 inches for each cycle of the scale. The scale D is what we shall term a "single line" scale, meaning that the graduations thereof extend in a line from one end of the rule to the other, not being divided with a portion of the scale being separated from, and running parallel with, another portion thereof.

Along the lower edge of the slide 18, there is another scale graduated in accordance with the logarithms of numbers 1 to 10, once repeated within the arbitrary base length of 16 inches, which scale is designated as the C scale. It is identical with and of the same unit length as the above mentioned D scale, so that the scales may be used with one another in the solutions of problems, such as ordinary multiplication and division.

The graduations on the C and D scales are designated by numbers from 1 to 10 twice repeated, in ascending order from the left toward the right end of the scales.

On the slide 18, adjacent to and inwardly of the said C scale, is the CI scale, which is similar to the said C and D scales but its graduations represent numbers increasing from right to left. That is, the CI scale is one graduated in accordance with the logarithms of numbers from 1 to 10, once repeated within the arbitrary base length of the rule of 16 inches, but the graduations are designated by numbers in ascending order from the right toward the left end of the rule. The CI scale is coextensive with the C scale.

In prior art rules, the D and C scales have only one cycle of logarithmic graduations from 1 to 10, and likewise the CI scale has only one such cycle. The CI scale, as is well-known in the art, is used in cooperation with the D scale in some operations, in place of the C scale, to avoid shifting the index. This scale serves the same use on the present rule, and it will be apparent that shifting of the index will be further avoided in a greater number of problems, by reason of having the said D, C and CI scales once repeated within the length of the rule.

On the lower edge of the upper area 14 of the body, disposed along the channel 12, is an A scale, graduated in accordance with the logarithms of numbers from 1 to 10, three times repeated within the arbitrary length of the rule of 16 inches, thus giving a unit length for each cycle of the scale of 4 inches Disposed along the upper edge of the slide 18, there is a B scale, which is identical with the above mentioned A scale.

The A and B scales cooperate together in the solutions of problems, such as ordinary multiplication and division, and the graduations of both are designated with numbers in ascending order from the left toward the right end of the rule.

It will be apparent that the A and B scales cooperate together and with the D, C and CI scales, in the solutions of problems, for instance those involving the squares and square roots of numbers.

In the prior art rules, the said A and B scales were only once repeated within the length of the rule, or within the lengths of the C and D scales. It will be obvious that even in the solutions of simple problems, the three times repeated cycles of the A and B scales, effect more convenient solutions, while decreasing the number of times which the index need be shifted.

Extending along the center of the slide 18 immediately above the CI scale is the S scale. This scale is graduated in accordance with the logarithms of the natural values of the sines of angles. These graduations are designated beginning with substantially 34' at the left hand end of the rule, in lateral or vertical alignment with the left hand indices of the C and B scales previously mentioned, and extending to the opposite end of the slide, the 90° point being in lateral or vertical alignment with the right hand indices of the said C and B scales.

In some prior art rules, the sine scales usually covered angles from about 5° and 43' to 90°, and for angles below 5° and 43', it was necessary to use a separate scale, called an ST scale, which was calibrated to the logarithms of sines and tangents of angles from substantially 34' to 5° and 43'. By reason of the additional cycles, in a single line, of the D, C, B and A scales, the S scale can be made longer to include the smaller angles, and by reason of its increased length, greater power is provided in the solutions of problems involving the sines of angles. Likewise, by reason of this new sine scale, with its associated logarithmic scales previously described, problems involving the sines of angles may be solved more conveniently while permitting the index to be set or shifted fewer times.

The 90° graduation of the sine scale is disposed in alignment with the right hand index of the C scale for the obvious reason that the natural value of the sine of 90° is 1. The other end of the sine scale terminates at the graduation of substantially 34', in alignment with the left index of the C scale, because the sine of 34' is approximately .01. It will be observed that the point designated 5° 43' on the S scale, is in alignment with the middle index of the C scale, because the sine of 5° 43' is approximately .1.

The sine scale will cooperate with the C scale for reading on the latter the natural values of the sines of each of the angles designated on the S scale, because of the above described relation of the two scales. The S scale may likewise be used in the well-known way in reading the natural values of the co-sines of angles on the C scale. The numeral designations on the S scale slant in the direction in which the angles increase, as is well-known in the art and described in the said Kells et al. Patent No. 2,170,144. There are two series of angle designations on the S scale which increase in opposite directions, one series being used for sines and the other for co-sines of angles.

On the slide 18 between the S and B scales, there is a single line T scale graduated in accordance with the logarithms of the natural values of the tangents of angles from substantially 5° and 43' to 84° and 18'.

Former slide rules in common use employ a tangent scale graduated in accordance with the logarithms of the natural values of tangents of angles, only from 5° and 43' to 45°. This increased range of the tangent scale, in cooperation with the novel D, C, and other scales of the present slide rule, likewise facilitates convenient solutions of many additional problems without excessive mechanical manipulation of the rule, as will be understood from the solutions of examples appearing hereinafter. The T scale is graduated as described, with the angles in ascending order from the left toward the right end of the rule. The graduation for 5° and 43' is placed in lateral or vertical alignment with the index of the C scale because the natural value of the tangent of 5° 43' is approximately .1.

The graduation of 84° and 18' of this scale is disposed in alignment with the right hand index of the C scale because the natural value of the tangent of 84° 18' is 10. It will be noted that the point designated 45°, or the T scale is in alignment with the middle index of the C scale, the natural value of the tangent of 45° being 1.

The natural values of the tangents of the angles indicated on the T scale can be read on the C scale, whereas the natural values of the cotangents of said angles can be read on the CI scale. However, natural cotangents can also be read on the C scale, from the angles on the T scale. The numeral designations on the T scale slant in the direction in which the angles increase, as in the case of the S scale mentioned above. There are two series of angle designations on the T scale, which increase in opposite directions, one series being used for tangents and the other for cotangents of angles.

At the outer edge of the upper surface 14 of the body of the rule, there is a single line P scale, graduated in accordance with the logarithms of the logarithms of numbers greater than unity, in ascending order from the left toward the right end of the rule, from $e^{.001}$ (approximately 1.001) up to $e^{10}$ (approximately 20,000).

The quantity $e$ (approximately equal to 2.72) is a well-known constant used as the base of natural logarithms, as distinguished from common logarithms, which are to the base 10.

In the prior art rules, for example the double face log log rule, the log log scales are usually divided into three coextensive parts disposed parallel to one another, one part including a range of from $e^{.01}$ (approximately 1.01) to $e^{.1}$ (approximately 1.15); the second part from $e^{.1}$ to $e$ (approximately 2.72) and the third part extending from $e$ to $e^{10}$ (approximately 20,000).

By reason of the arrangement of the single line log log scale P as described above, and the association therewith of the novel A and B scales, the rule provides for more convenient solutions of problems involving positive powers or fractional powers of numbers greater than unity, with decreased mechanical manipulations of the rule, and in such manner that the correct location of the decimal point is plainly evident. A single number greater than unity can be successively raised to a multiplicity of positive powers or fractional powers, with a single setting of the slide. Furthermore, problems involving the above powers may be solved without the operator being annoyed with considerations of the intricacies of the rule, or selecting the proper zone thereof in which to read the answer, which is the case with the prior art rules including the double face log log rule.

Between the P and A scales, there is an F scale, graduated in accordance with the logarithms of the cologarithms of numbers less than unity. This is also a single line scale, extending from $e^{-.001}$ (approximately .999) in lateral or vertical alignment with the left hand index of the A scale and graduated in descending order toward the right hand end of the rule, terminating at a graduation of $e^{-10}$ (approximately .00005) in alignment with the right hand index of the A scale. By reason of the above arrangement, reciprocals of numbers on the P scale may be read in alignment therewith on the F scale, or vice versa.

In prior art rules, the scale of logarithms of cologarithms of numbers less than unity, is usually in two parallel and co-extensive parts, one part including numbers from $e^{-.001}$ to $e^{-.1}$ (approximately .905), and the other part including numbers from substantially $e^{-.1}$ to substantially $e^{-10}$.

It will be evident that the arrangement of the above described F scale in association with the novel A and B scales, provides for convenient solutions of problems such as those concerned with positive powers, or fractional powers of numbers less than unity. The scales are so arranged, as will be evident from the examples to be described, that the operator can raise a single number less than unity successively to a multiplicity of positive powers or fractional powers, with a single setting of the slide, and with the location of the decimal point being plainly evident. Furthermore, in solving the above problems, it is unnecessary for the operator to speculate on what zone of the rule the answer should be read, as is the case in prior art rules.

It will also be evident that the said P and F scales, and the said A and B scales, in cooperation with one another, provide for convenient solutions of problems, such as those which may include positive or negative powers and fractional powers of numbers either greater or less than unity.

It will be noted that in addition to the end indices of the A scale, there are three additional interior indices (where the number 1 appears) between the ends of the scale. These will be called, respectively, the left center, center, and right center indices. These interior indices are in alignment with points on the P and F scales in accordance with the following table:

| A | P | F |
|---|---|---|
| Left center index | $e^{.01}$ (approx. 1.01) | $e^{-.01}$ (approx. .99). |
| Center index | $e^{.1}$ (approx. 1.105) | $e^{-.1}$ (approx. .905). |
| Right center index | $e$ (approx. 2.72) | $e^{-1}$ (approx. .358). |

The following illustrative examples serve to demonstrate the simplicity of operation of the present rule, and the elimination of mechanical manipulations and the confusion which resulted therefrom, which characterized the use of prior art rules. The values of the results obtained are slide rule values, sufficiently accurate for slide rule purposes, but are not asserted to be as accurate as would be the case if they had been worked out with logarithmic tables. Some of the problems are illustrated by triangles in Figures 4 through 8 of the drawing, and it will be understood that these triangles are not intended to be drawn to scale, but merely for convenient illustration of the problems.

*Example (a).*—Evaluate 46×72×.305.

With the prior art double face log log rule, this problem is solved as follows:
 Move hair line to 46 on the D.
 Draw 72 of CI under hair line.
 Change indices on C.
 Opposite 305 on C read 1010 on D.

It will be noted that even in the solution of this simple problem, a change of indices was necessary.

This problem may be solved with the rule of the present invention as follows:
 Move hair line to 46 on D left.
 Draw 72 of CI left under hair line.
 Opposite 305 on C left read 1010 on D.

It will be noted that no change of indices was necessary to solve the problem.

*Example (b).*—Solve the triangle shown in Figure 4, being given the values indicated in the figure.

This problem may be solved by the law of sines, that is, the proportional relation of the sine of each angle of the triangle to its opposite side, is the same as the sine of any other angle of the triangle, to its opposite side. The triangle would be solved by the prior art double face log log rule as follows:
 Move hair line to 85 on D.
 Draw 14° on S under the hair line.
 Change indices on C.
 Opposite 58° on S read $a=29.8$ on D.
 Opposite 72° on S read $b=33.4$ on D.

The angle 72° was used in the solution, because the angle B is greater than 90°. That is, knowing angles A and C and that their sum is 72°, it is then known that angle B would be equal to 108°. However, by a well known law, sine B equals sine (180°−B) and is therefore equal to the sine of 72°.

It will be noted that a change of indices is required in solving this problem with prior art rules. The solution of the problem with the rule of the present invention is as follows:
 Move hair line to 85 on D left.
 Draw 14° of S under hair line.
 Opposite 58° on S read $a=29.8$ on D.
 Opposite 72° on S read $b=33.4$ on D.

It will be noted that no change of indices is required in the solution of the problem with the rule of the present invention.

*Example (c).*—Solve the triangle of Figure 5 being given the parts indicated in the figure.

This triangle may also be solved by the law of sines.

The problem would be solved with the prior art double face log log rule as follows:
 Move hair line to 9 on D.
 Draw 11° of S under hair line.
 Change indices on C.
 Opposite 14 on C read $B=17°\ 17'$ on S.
 Opposite 28° 17' on S read $c=22.4$ on D.
 Change indices on C.
 Opposite 6° 17' on S read $c'=5.16$.

The value 28° 17' was used in finding $c$, being equal to A plus B, which were then known, for sine C equals sine (180°−C)=28° 17'. The angle 6° 17' was used in finding $c'$, for B=A+C', and therefore C'=B−A which is equal to 17° 17'−11°, or 6° 17'.

It will be noted in solving this problem with a prior art rule that at least three settings of the slide are required, indices being shifted twice. The problem is solved with the rule of the present invention as follows:
 Move hair line to 9 on D left.
 Draw 11° on S under hair line.
 Opposite 14 on D right read $B=17°\ 17'$ on S.
 Opposite 28° 17' on S read $c=22.4$ on D.
 Opposite 6° 17' on S read $c'=5.16$.

It will be noted that in this solution only one setting of the slide is required, no shifting of indices being required.

*Example (c).*—Find $x$ and $y$ if $$\frac{21}{78}=\frac{x}{12}=\frac{8.3}{y}$$

This is a type of proportion expression frequently encountered in the solutions of problems. The problem is solved with a rule such as the prior art double face log log rule as follows:
 Opposite 78 on D set 21 on C.
 Opposite 12 on D read $x=3.23$ on C.
 Change indices on C.
 Opposite 8.3 on C read $y=30.8$ on D.

The proportion principle is frequently used, and many mistakes are made during solutions with prior art rules. The shifting of indices in solving such problems is confusing, and the elimination of such shifting is of great importance. This example is solved by the rule of the present invention as follows:
 Opposite 78 on D left set 21 of C.
 Opposite 12 on D read $x=3.23$ on C.
 Opposite 8.3 on C read $y=30.8$ on D.

As in the other examples, only a single setting of the slide is required when using the rule of this invention.

*Example (d).*—Find the value of $h$ in the triangle of Figure 6, being given the parts indicated in the figure.

Using the prior art double face log log rule, the problem is solved as follows:
 Move hair line to 130 on D.
 Draw 3° of ST under the hair line.
 Change indices.
 Move hair line to 10° on S.
 Draw 84° of S under hair line.
 Change indices.
 Move hair line to 7° on S.
 At hair line read 52.9 on D.

In explanation of the above manipulations, when the hair line was pushed to 10° on S, it located the proper value of the side $a$ of the triangle on the D scale, but as this value was not sought for, it was unnecessary to record the same. The hair line thus being set at $a$, a new proportion for the triangle including the side $a$ and the side $h$ was required, and to apply the law of sines the angle opposite side $a$ was brought under the hair line. As previously mentioned, the sine of an angle is equal to the sine of 180° minus the angle. Therefore the 84° point was brought under the hair line in alignment with the value of $a$, which, as previously mentioned, need not be recorded.

This problem may be solved with marked simplicity on the rule of the present invention as follows:

Draw hair line to 130 on D right.
Draw 3° of S under hair line.
Move hair line to 10° on S.
Draw 84° of S under hair line.
Move hair line to 7° on S.
At hair line read 52.9 on D.

It will be noted that in solving the problem with the rule of the present invention, no change of indices was required, whereas two such changes are required in solving the problem with prior art rules. Furthermore the operator of the rule of the present application is guided to the proper location of the decimal point without arithmetical computation. That is, when 130 was first located or selected on the D scale of the rule of the present invention, and because there is no index shifting in solving the problem, the proper location of the decimal point of any number subsequently read on the D scale is determined by simple observation of its relation to the 130 point. The 130 point having first been designated in the original setting, when the value of $h$ was read as 529 in the proceding cycle of the D scale, simple observation shows the operator that the proper value is 52.9, because it is directly to the left of the 130 point, and in the preceding cycle of the D scale.

As pointed out above, the tangent scales on the Mannheim type rules and the double face log log rules actually only deal with angles of 45° or less. Consequently, in using these rules, an operator following fundamental principles of triangle solutions will be lead into error. This is illustrated by the following problem:

*Example (e).*—In the triangle illustrated in Figure 7, being given values there indicated, find the value of the angle A.

The most simple approach to the solution of this problem is to set up the expression:

$$\text{Tan } A = \frac{87}{27} \text{ or } \frac{\tan A}{87} = \frac{1}{27}$$

Following logical slide rule procedure the operator would solve the problem as follows:
Move index of C to 27 on D.
Opposite 87 on D read A=17° 45′ on T.
This answer is incorrect, for obviously from Figure 7 the angle A is greater than 45°. Thus, such prior art rules as the double face log log rule, logically set, give incorrect answers in solving for angles whose tangents are greater than unity. To obtain the correct answer on these log log rules, the operator must first find the angle of the triangle whose tangent is less than unity, i. e., the angle B in the present problem, and then substract it from 90°. It is evident that in this and similar solutions, the application of the proportion principle fails with these prior art rules. The operator cannot keep his mind on the problem, but must remember intricacies and pecularities of the rule which would trap him into an incorrect answer. Experience has shown that operators, particularly students, make many errors in dealing with problems of this type involving use of the old tangent scale confined to angles less than 45°.

On the rule of the present invention, as described before, the new tangents scale extends between 5° 43′ and 84° 18′, and is associated with a scale of logarithms of numbers of the D scale which is once repeated, providing an intermediate index. With this arrangement, the operator may use the same logical methods of solution in dealing with angles greater than 45°, as he would with those involving angles less than 45°, and the application of the proportion principle is simple and direct, and always correct.

Referring to the above example, and with reference to the triangle of Figure 7, it was found that:

$$\frac{\text{Tan } A}{87} = \frac{1}{27}$$

This expression is solved for the angle A with the rule of the present invention as follows:
Move the middle index of C to 27 on D right.
Opposite 87 on D right read A=72° 46′ on T.
The same result would have been obtained if the left cycle on D scale had been used. In either case, and with the rule of the present invention, the correct angle is selected on the T scale, because once having established or selected the location of 27 on the D scale, the operator knows that the proper 87 on the D scale to read from, is the next one up the scale or to the right of the 27 point.

The following example shows how the triangle of Figure 7 can be completely solved, whether the operator begins with the solution for the smaller or larger of the acute angles of the triangle. That is, the application of the proportion principle is correct, using the rule of the present invention, no matter which acute angle is first solved for.

*Example (f).*—Completely solve the triangle of Figure 7.

It will be understood that:

$$\frac{\text{Tan } B}{27} = \frac{1}{87}$$

The solution for the value of B is as follows:
Move middle index of C to 87 on D left.
Opposite 27 on D left read B=17° 14′ on T.
Remembering that the hair line is already set at 27 on D, and that according to the law of sines:

$$\frac{27}{\sin B} = \frac{c}{\sin 90°}$$

the solution is completed, first setting the rule for the law of sines as follows:
Draw 17° 14′ of S under hair line.
Read c=91.3 on D opposite the right index of C.
The triangle may be solved with simplicity, by first obtaining the value of B, as above, or by first obtaining the value of A, remembering that:

$$\frac{\text{Tan } A}{87} = \frac{1}{27}$$

The solution in this manner is as follows:
Move middle index of C to 27 on D left.
Opposite 87 on D left read A=72° 46′ on T.
As before, remembering that the hair line is already set at 87 on D, and that according to the law of sines:

$$\frac{87}{\sin A} = \frac{c}{\sin 90°}$$

the completion of the solution is as follows:
Draw 72° 46′ of S under the hair line.
Opposite index of C reads c=91.3 on D.
In using the rule of the present invention there is no need to consider pecularities or deficiencies of the tangent scale, and logical methods can be applied in the solutions of triangles, proceeding to first obtain either the smaller or larger of the acute angles of the triangle, whichever is more convenient.

The rule of the present invention is also convenient for solutions of triangles being given two sides and the included angle. The present rule has a more general and wider application in solving such triangles, than do any of the rules of the prior art.

*Example (g).*—Solve the triangle of Figure 8 being given the parts there indicated.

A well-known law of tangents is:

$$\frac{\operatorname{Tan} \tfrac{1}{2}(A-B)}{a-b} = \frac{\tan \tfrac{1}{2}(A+B)}{a+b}$$

Applying this formula to the present example:

$$\frac{\operatorname{Tan} \tfrac{1}{2}(A-B)}{30} = \frac{\tan \tfrac{1}{2}(160°)}{120} = \frac{\tan 80°}{120}$$

The problem may be solved as follows:
Move the hair line to 120 on D right.
It will be evident that when this is done, the operator has simultaneously established the location of the 30 point on D, which he will subsequently use. Continuing:
Draw 80° of T under the hair line.
Move hair line to 30 on D left.
Read $\tfrac{1}{2}(A-B) = 54° \ 48'$ on T, under hair line.

Thereafter the equations $\tfrac{1}{2}(A-B) = 54° \ 48'$ and $\tfrac{1}{2}(A+B) = 80°$ may be simultaneously solved, arithmetically, to obtain $A = 134° \ 48'$ and $B = 25° \ 12'$. The solution may now be completed to find the side $c$ of the triangle by using the law of sines as previously described. Prior art rules such as the double face log log rule cannot be used in all cases to solve such triangles as in this example by the above simple methods because such rules do not have a tangent scale for angles greater than 45°.

Furthermore, a uniform method of solving the triangle referred to above by means of right triangles can be applied. With prior art rules, variations of methods to meet the pecularities and deficiencies of the rules are necessary. All of this is important, for because the rule of the present invention is more easily learned and operated, fixed habits can be formed which apply without exceptions and variations, and thus the rule can be automatically used while the operator's attention is devoted exclusively to the problem being solved.

Turning now to the so-called log log scales, which were introduced to deal with such powers as for example; $8.32^{5.16}$ and $.134^{3.11}$, it has been found that such prior art rules as the double face log log rule do not deal with such problems in a satisfactory manner.

In these prior art rules there are three scales for evaluating powers of numbers greater than unity. They also have two scales for powers of numbers less than unity, there being separate conventional scales of logarithms of numbers to cooperate with these different sets of so-called log log scales. The arrangement of these scales in prior art rules raises a question in the operator's mind at each solution as to the proper zone of the rule to be read, as well as causing confusion in the proper disposition of the decimal point.

With the rule of the present invention the single line P scale replaces the scales conventionally known as LL1, LL2 and LL3 of the prior art rules, and the single line F scale replaces the scales conventionally termed as the LLO and LLOO scales. On the P and F scales of the rule of the present invention, the numbers increase or decrease uniformly in natural order, and there is no difficulty in finding the proper zone of the rule to be employed, or in which to read the answer, and there is likewise no difficulty in locating the decimal point.

The power scales P and F of the rule of the present invention can be used to find positive and negative powers and fractional powers of numbers greater and less than unity, for instance such expressions as $a^k$, $a^{-k}$, $e^m$, $e^{-m}$, and also the logarithms of numbers to any base. This may be demonstrated by the following problems:

*Example (h).*—Evaluate the following:
$2.1^2$, $2.1^{-2}$, $2.1^3$, $2.1^{-3}$, $2.1^{.7}$, $2.1^{-.7}$
Move hair line to 2.1 on P.
Draw middle index 1 of B under hair line.
Move hair line to 2 on B. (Slightly to right of 1.)
At hair line read $2.1^2 = 4.41$ on P.
At hair line read $2.1^{-2} = .227$ on F.
Push hair line to 3 on B (slightly to the right).
At hair line read $2.1^3 = 9.25$ on P.
At hair line read $2.1^{-3} = .108$ on F.
Move hair line to .7 on B (slightly to the left of 1).
At hair line read $2.1^{.7} = 1.68$ on P.
At hair line read $2.1^{-.7} = .595$ on F.

On such prior art rules as the double face log log rule, to obtain a negative power or a negative fractional power of a number other than $e$, it is necessary, in the solution, to obtain by a separate setting of the rule the reciprocal of the number, or the reciprocal of the corresponding positive power or fractional power of the number. From the above example, it is obvious that this troublesome departure from a logical solution, necessary to suit the pecularities and deficiencies of the older rules, is avoided.

A disadvantage of the double face log log rule is that numbers like $2.1^{-2}$, $2.1^{-3}$, and $2.1^{-.7}$ cannot be read directly on the scales designated LL of that rule, nor can hyperbolic sines, co-sines and tangents of numbers be found with convenience as they can be found with the rule of the present invention.

For instance, the hyperbolic sine of an angle is equal to the expression:

$$\frac{e^x - e^{-x}}{2}$$

From the above description, it will be understood how the powers of $e$ in this expression may be computed with a single setting of the slide, for any given value of $x$.

Likewise, the rule is similarly convenient for use in obtaining values of the other hyperbolic functions, the expressions or formulae of which may involve finding positive and negative powers and fractional powers of numbers.

In using the rule of the present invention, there is no difficulty encountered in locating the decimal point, because each number is located in its natural position relative to one. There is always a continuous B scale opposite a continuous power scale for a large part of the complete range of the scales. In prior art rules such as the double face log log rule, when a setting is made on the well known LL scales, gaps occur on each partial scale along which the operating scales are not opposed, resulting in confusion in the mind of the operator, and diverting attention from the problem being solved to the intricacies and deficiencies of the rule.

The above description of the rule of the present invention may be consolidated in the following table based on an assumed length of 16 inches for the calibrated part of the rule. It will be understood, however, that the scales may be made longer or shorter for different types of rules. For instance, a ten-inch beginners rule may be found to be convenient in actual use. The 16-inch rule may be arranged as follows, each scale cooperating with other scales as indicated, in the solutions of problems.

| Scale | Unit length | Scales with which it coacts |
|---|---|---|
| D | 8″ repeated once | C, CI, B, A, S, T |
| C | 8″ repeated once | D, CI, B, A, S, T |
| CI | 8″ repeated once | D, C, S, T, A, B |
| B | 4″ repeated 3 times | D, A, C, CI, S, T, P, F |
| A | 4″ repeated 3 times | D, A, CI, B, S, T, P, F |
| S | 8″ | D, C, CI, A, B |
| T | 8″ | D, C, CI, A, B |
| P | 4″ | A, B, F |
| F | 4″ | A, B, P |

While the respective scales most frequently coact with one another as indicated above, it will be understood that each scale coacts with every other scale in the sense that it may be used in connection therewith in the solutions of particular problems. The above table does not mention cooperation of scales which may coact, but which are used with one another only infrequently in the solutions of problems.

From the above table, it will be seen that the D, C, and CI scales are to the same unit length. That is, these scales of logarithms of numbers are graduated through a complete cycle of numbers between consecutive indices in a length of 8 inches. Similarly, the B and A scales are to the same unit length which is ½ that of the D, C, and CI scales.

The S scale is designated in the table as having the same unit length as the C scale, because the length of the scale from the angle whose natural sine is .01 to the angle whose natural sine is .1 is equal to the length of a complete cycle of the C scale. Or, the length of the S scale from the angle whose natural sine is .1 to the angle whose natural sine is 1 is equal to the length of a complete cycle of C scale.

Similarly, the T scale is designated in the table as being of the same unit length as the C scale, because the length of the T scale from the angle whose natural tangent is 1 to the angle whose natural tangent is 10 is equal to the length of a complete cycle of the C scale. Stated in another way, the length of the T scale from the angle whose natural tangent is $\frac{1}{10}$ to the angle whose natural tangent is 1 is equal to the length of a complete cycle of the C scale.

In the above table, the P and F scales are designated as having the same unit length as the A scale, because the length between the successive powers of 10 of e on these scales, is equal to the length of a complete cycle of the A scale.

One of the most pronounced departures of the rule of the present invention from prior art rules is in the arrangement of the tangent and sine scales as described above. In the prior art rules, of the Mannheim type, the tangent scale is associated primarily with the conventionally termed D scale of logarithms of numbers, and the sine scale with the conventionally termed A scale of logarithms of numbers. This prior art arrangement involves great difficulty and loss of power in computations involving the trigonometric functions.

The rule of the present invention employs only nine scales all on one face, as opposed to 20 scales on the two faces of the prior art double face log log rule. By this arrangement, the mechanical manipulations of turning the rule over, or turning the slide over, are avoided in the use of the rule of the present invention. The present rule is more simple in appearance, and is more simple to operate due to the decreased number of scales, which in turn also reduces the cost of manufacture.

In the claims we have described certain of the scales as being substantially co-extensive. By "substantially co-extensive" we do not mean that the scales must be of actually the same length, but only that they should be contiguous to one another as in parallel relation, in the sense that they are arranged or can be moved with respect to one another for use in the solutions of problems. For instance, one scale might be somewhat longer or shorter than another, but they would still be co-extensive in the sense that portions of the respective scales could be used with one another or could be moved with respect to one another, in the solutions of problems. We have also recited the relationship between certain of the scales when the rule is "closed." By this, we do not necessarily mean that one part of the rule cannot project beyond another, but that corresponding indices of the scales are in alignment. For instance, in Figure 1a of the drawing, the rule is closed because the respective indices of the relatively movable members are in alignment. Rules may, of course, be designed wherein one part projects beyond another, perhaps for convenience in operating the rule, and yet the rule will be closed, within our meaning, when the indices are in alignment. Furthermore, in the claims, we have referred to consecutive indices, meaning consecutive 1 points on the scales at the completion of each logarithm cycle. These consecutive indices may be numbered in any manner, such as 1, 10, 20 etc.

It will be apparent that various changes may be made in the structure and in the arrangement of the scales disclosed herein without departing from the invention.

We claim:

1. A slide rule comprising members relatively movable with respect to each other, said members having scales thereon, said scales being substantially coextensive when the rule is in one position and graduated to cooperate with one another in the solutions of problems, a single line scale on one of the said members graduated in accordance with the logarithms of the logarithms of numbers greater than unity from $e^{.001}$ to $e^{10}$, arranged in ascending order from one end of the rule toward the other, the scale of the other of said members being a single line and graduated in accordance with the logarithms of numbers arranged in ascending order from one end of the rule toward the other in the same direction as the single line scale on said first named member, said scale of logarithms of numbers being repeated three times to provide four such scales and providing three indices between the ends thereof, one of said indices being aligned with the e point of said single line scale on said first named member when the rule is in said first position, said scales being graduated to the same unit length.

2. A slide rule comprising members relatively movable with respect to each other, said members having scales thereon, said scales being substantially coextensive when the rule is in one position and graduated to cooperate with one another in the solutions of problems, a single line scale on one of the said members graduated in accordance with the logarithms of the logarithms of numbers greater than unity from $e^{.001}$ to $e^{10}$, arranged in ascending order from one end of the rule toward the other, the scale of the other of said members being a single line and graduated in accordance with the logarithms of numbers in ascending order from one end of the rule toward the other in the same direction as the numbers on the single line scale on said first named member, said scale of logarithms of numbers being repeated once to provide two such scales, said scales being of the same unit length.

3. A slide rule comprising members relatively movable with respect to each other, said members having scales thereon, said scales being substantially coextensive when the rule is in one position and graduated to cooperate with one another in the solutions of problems, a single line scale on one of the said members graduated in accordance with the logarithms of the logarithms of numbers greater than unity from $e^{.001}$ to $e^{10}$, arranged in ascending order from one end of the rule toward the other, the scale of the other of said members being a single line and graduated in accordance with the logarithms of numbers arranged in ascending order from one end of the rule toward the other in the opposite direction to the numbers on the single line scale of said first named member, said scale of logarithms of numbers being repeated once to provide two such scales, said scales being the same unit length.

4. A slide rule comprising members relatively movable with respect to each other, said members having scales thereon, said scales being substantially coextensive when the rule is in one position and graduated to cooperate with one another in the solutions of the problems, a single line scale on one of the said members graduated in accordance with the logarithms of the logarithms of numbers greater than unity from $e^{.001}$ to $e^{10}$, arranged in ascending order from one end of the rule toward the other, the scale of the other of said members being a single line and graduated in accordance with the logarithms of the natural values of the sines of the angles between 35' and 90° arranged in ascending order from one end of the rule toward the other in the same direction as the numbers on the single line scale of said first named member.

5. A slide rule comprising members relatively movable with respect to each other, said members having scales thereon, said scales being substantially coextensive when the rule is in one position and graduated to cooperate with one another in the solutions of problems, a single line scale on one of the said members graduated in accordance with the logarithms of the logarithms of numbers greater than unity from $e^{.001}$ to $e^{10}$, arranged in ascending order from one end of the rule toward the other, the scale of the other of said members being a single line and graduated in accordance with the logarithms of the natural values of the tangents of the angles between 5° 43' and 84° 18', arranged in ascending order from one end of the rule toward the other in the same direction as the numbers on the single line scale of said first named member.

JOHN TYLER.
LYMAN M. KELLS.
WILLIS F. KERN.
JAMES R. BLAND.